United States Patent
Tsuruma (10) Patent No.: US 6,917,463 B2
(45) Date of Patent: Jul. 12, 2005

(54) WAVELENGTH CONVERTING ELEMENT AND METHOD OF MANUFACTURE THEREOF

(75) Inventor: Isao Tsuruma, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 326 days.

(21) Appl. No.: 09/983,057

(22) Filed: Oct. 23, 2001

(65) Prior Publication Data

US 2002/0054425 A1 May 9, 2002

(30) Foreign Application Priority Data

Oct. 24, 2000 (JP) ........................................ 2000-323922

(51) Int. Cl.[7] ............................................. G02F 1/365
(52) U.S. Cl. ........................................ 359/332; 430/321
(58) Field of Search ................................ 359/326–332; 430/321

(56) References Cited

U.S. PATENT DOCUMENTS

| | | | | |
|---|---|---|---|---|
| 5,113,469 A | * | 5/1992 | Hatakoshi et al. | 385/122 |
| 5,170,460 A | * | 12/1992 | Arvidsson et al. | 385/129 |
| 5,424,867 A | * | 6/1995 | Nihei et al. | 359/326 |
| 5,434,700 A | * | 7/1995 | Yoo | 359/332 |
| 5,515,471 A | * | 5/1996 | Yamamoto et al. | 385/122 |
| 5,652,674 A | * | 7/1997 | Mizuuchi et al. | 359/326 |
| 5,875,053 A | * | 2/1999 | Webjorn et al. | 359/326 |
| 6,323,990 B1 | * | 11/2001 | Yamamoto et al. | 359/328 |

FOREIGN PATENT DOCUMENTS

| | | | | |
|---|---|---|---|---|
| JP | 4-335330 | * | 11/1992 | G02F/1/37 |
| JP | 9-218431 | | 8/1997 | G02F/1/37 |
| JP | 9-281536 | | 10/1997 | G02F/1/37 |
| JP | 11-72810 | | 3/1999 | G02F/1/37 |

* cited by examiner

Primary Examiner—John D. Lee
(74) Attorney, Agent, or Firm—Sughrue Mion, PLLC

(57) ABSTRACT

A wavelength converting element is provided in which a fundamental wave with respect to an optical crystal substrate and a peak of a vertical transverse mode of a second harmonic are made to coincide, the converting efficiency is good, and a beam shape which enables good joining to a lens or an optical fiber is obtained. Given that an angle formed by a surface of the optical crystal substrate and a C axis of the optical crystal substrate is $\theta$, a period at which inverted domains are formed is p, and a distance from a distal end of a comb-shaped electrode for forming the inverted domain to a central position of a waveguide is G, in the ion implantation, a concentration peak of the ion implantation is formed at a distance of substantially $(G \cdot \tan\theta + p/4)$ from the surface of the optical crystal substrate.

20 Claims, 7 Drawing Sheets

UV EXPOSURE

WAVELENGTH CONVERTING ELEMENT AND METHOD OF MANUFACTURE THEREOF

BACKGROUND OF THE INVENTION

1. Field of the Invention

The present invention relates to a wavelength converting element and a method of manufacture thereof, and in particular, to a wavelength converting element in which the peak of a vertical transverse mode with respect to a substrate of a second harmonic is made to coincide with a fundamental wave such that an improvement in the wavelength converting efficiency and an improvement in the beam shape are achieved, and to a method of manufacturing the wavelength converting element.

2. Description of the Related Art

Wavelength converting elements have been conventionally manufactured which wavelength-convert a fundamental wave into a second harmonic by using an element provided with a region (inverted domains) at which spontaneous polarization of a ferroelectric having a non-linear optical effect, e.g., a crystal such as $LiNbO_3$ or $LiTaO_3$, is periodically inverted.

The inverted domains used here have the feature that the inversion of the polarization proceeds along the C axis in theory. In a case, such as the case of a Z plate, in which the C axis is perpendicular to the substrate surface, the inverted domains are formed at the interior of the substrate. Even if a waveguide is formed at the surface thereof, the joining with the TE mode is poor. Thus, it is difficult to efficiently join a semiconductor laser. In order to improve the joining with a semiconductor laser, it is preferable to use an X plate. However, in a case, such as the case of an X plate, in which the C axis is parallel to the substrate surface, the inverted domains are formed only in a vicinity of the surface in order to be formed along the C axis. Thus, there are problems in that the inverted domains are only formed at a shallow position with respect to the waveguide such that there is little overlapping of the fundamental wave and the inverted domain portion, and the waveguide converting efficiency is poor.

A waveguide wavelength converting element, which uses a substrate at which the orientation of the spontaneous polarization forms a predetermined angle with respect to one surface thereof, has been proposed in Japanese Patent Application Laid-Open (JP-A) No. 9-218431. In this wavelength converting element, by inclining the C axis from the substrate surface, the inverted domains are formed toward the interior of the substrate. In this way, the overlapping of the waveguide and the inverted domains is improved, and the wavelength converting efficiency is improved.

This wavelength converting element uses a proton exchange annealing method as the method for fabricating the waveguide. Thus, a flat waveguide, at whose surface portions having a high refractive index are formed, is formed. Therefore, problems arise in that offset arises between the peaks of the fundamental wave and the second harmonic, and the peak of the second harmonic and the inverted domains are offset.

In the inventions disclosed in JP-A Nos. 9-281536 and 11-72810, a high refractive index layer is formed at the surface of the substrate so as to strengthen the confinement of the fundamental wave. In this way, the overlapping of the fundamental wave and the second harmonic is relatively improved and an attempt is made to improve the converting efficiency and the beam shape. However, in these inventions as well, there is no change from and no substantial improvement over a flat waveguide whose refractive index distribution is such that the vicinity of the surface has a high refractive index.

SUMMARY OF THE INVENTION

The present invention has been proposed in order to overcome the above-described problems, and an object of the present invention is to provide a wavelength converting element and method of manufacture thereof in which, by forming a core portion of a waveguide at the interior of a substrate, a fundamental wave with respect to the substrate and the peak of the vertical transverse mode of a second harmonic are made to coincide, and which, by making this peak overlap with the inverted domains as well, obtains a high converting efficiency and a beam shape which enables good joining with a lens or an optical fiber.

A first aspect of the present invention is a wavelength converting element comprising: an optical crystal substrate; inverted domains formed at an interior of the optical crystal substrate; and a waveguide which is formed by ion implantation and which intersects the inverted domains.

A second aspect of the present invention is a method of manufacturing a wavelength converting element comprising the step of: forming a waveguide by carrying out ion implantation after inverted domains have been formed at an interior of an optical crystal substrate, or forming inverted domains after a waveguide has been formed at an interior of an optical crystal substrate by carrying out ion implantation.

The waveguide is formed by ion implantation, and has a refractive index peak at the interior of the optical crystal substrate. The position of the peak of the refractive indices within the optical crystal substrate is determined by the concentration distribution of the implanted ions, and can be adjusted to be a desired depth by controlling the ion implantation energy. Ion implantation is carried out and the waveguide is fabricated so as to optimize the overlapping with the inverted domains. In this way, a waveguide having a refractive index distribution which is substantially a Gaussian distribution is formed at the interior of the substrate, the fundamental wave and the peak of the vertical transverse mode of the second harmonic can be made to coincide, and the beam shape of the laser is good. Note that the order of forming the inverted domains and the waveguide does not matter. For example, the inverted domains may be formed after the waveguide is formed. At this time, the pitch and the optimal size of the inverted domains may be computed in advance, and ion implantation may be carried out so as to suit such inverted domains.

It is preferable that the method of manufacturing the wavelength converting element comprises the steps of: forming inverted domains at an interior of an optical crystal substrate; pattern-forming a metal film on the optical crystal substrate at which the inverted domains have been formed, such that at least a region at which a waveguide is to be formed is exposed; applying a negative photoresist on the patterned metal film; exposing the negative photoresist by using the patterned metal film as a mask, by irradiating ultraviolet light from a reverse surface of the optical crystal substrate to which the negative photoresist has been applied; carrying out developing thereafter so as to form a resist pattern on the region at which the waveguide is to be formed; forming a metal film by electroplating by using the patterned metal film as an electrode and by using the negative photoresist as a mask; removing the negative photoresist thereafter; carrying out ion implantation at portions of the optical crystal substrate from which the negative photoresist has been removed, by using the metal film formed by the electroplating as an ion implantation mask; and forming an optical waveguide by carrying out annealing thereafter.

It is preferable that, in the ion implantation, the concentration peak of the ion implantation is formed at a distance of substantially $(G \cdot \tan\theta + p/4)$ from a surface of the optical crystal substrate, where an angle formed by the surface of the optical crystal substrate and a C axis of the optical crystal substrate is $\theta$, a period at which the inverted domains are formed is p, and a distance from a distal end of a comb-shaped electrode, which is for forming the inverted domain and which is formed at the surface of the optical crystal substrate, to a central position of the waveguide formed by the ion implantation is G.

In this way, a waveguide having a refractive index distribution which is substantially a Gaussian distribution is formed at a distance which is substantially $(G \cdot \tan\theta + p/4)$ from the surface of the optical crystal substrate. As a result, the fundamental wave and the vertical transverse mode peak of the second harmonic can be made to coincide, and a good laser beam shape can be obtained.

Further, it is preferable to use a gold film as the metal film which is formed by the electroplating. This is because gold film has a good ion impeding ability, and because forming a gold film to a film thickness which can impede ions is the easiest method.

The wavelength converting element of the present invention is provided with inverted domains which are formed at the interior of an optical crystal substrate, and a waveguide which is formed by ion implantation and intersects the inverted domains. In this way, a laser of a beam shape, which facilitates joining with a lens or optical fiber, can be emitted at a high wavelength converting efficiency.

In the method for manufacturing a wavelength converting element relating to the present invention, a waveguide, which has a refractive index distribution peak at the interior of a substrate, is fabricated by carrying out ion implantation on an optical crystal substrate. In this way, a wavelength converting element, which has a high wavelength converting efficiency and which emits a laser of a beam shape which facilitates joining with a lens or optical fiber, can be manufactured.

The method of manufacturing a wavelength converting element relating to the present invention uses, for example, a gold film as the ion implantation mask. This is because forming a gold film, which has a good ion impeding ability, to a film thickness which can impede ions is the easiest method for impeding the penetration of protons which pass through easily.

Moreover, at the time of forming the gold film, the method for manufacturing a wavelength converting element relating to the present invention uses, as the mask, a negative photoresist pattern which is exposed from the reverse surface. This is to prevent control of the width of the waveguide from becoming difficult due to the gold film being grown by wraparound also at the region at which the waveguide is to be formed, in a case in which simply electroplating is carried out.

A conventional method of preventing wraparound of the plating is a method in which, simply, a Cr/Au film is formed at the entire surface of the substrate, and the waveguide forming region is patterned by a thick-film resist. Thereafter, Au plating is carried out by using the Cr/Au as electrodes, and the resist is removed. Thereafter, the Cr/Au is removed by etching. However, in this method, because the width of the waveguide is determined by the patterning of the thick-film resist, the patterning of the thick-film resist must be carried out with high accuracy, which is technically difficult. Further, at the time of etching the Cr/Au, the plated portions are also etched. Thus, at this time as well, because the width of the waveguide changes, highly accurate etching must be carried out here as well, which is technically difficult.

On the other hand, in the method for manufacturing a wavelength converting element relating to the present invention, in the process for forming the waveguide, the waveguide can be fabricated by using a negative photoresist of a film thickness which is relatively thin, and highly accurate patterning is possible. Further, in the process for forming the mask at the negative photoresist, patterning is carried out by using a metal film as the mask. Thus, because there is no shifting of positions in theory, and because there is no aligning, the exposure work itself is facilitated.

DESCRIPTION OF THE PREFERRED EMBODIMENT

An embodiment of the present invention will be described in detail hereinafter with reference to the figures.

Figure 1:
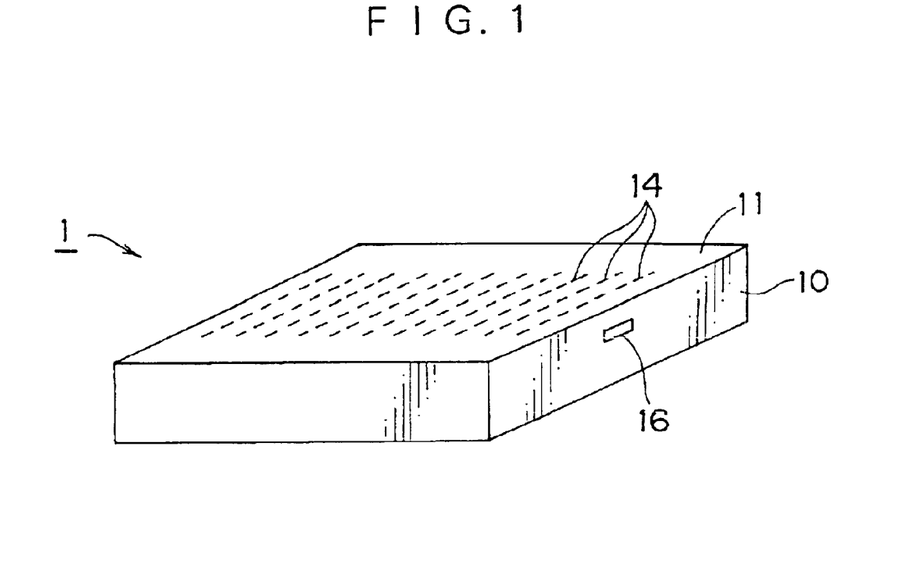
FIG. 1 is a schematic perspective view of a wavelength converting element relating to an embodiment of the present invention.

As shown in FIG. 1, a wavelength converting element 1 relating to the embodiment of the present invention has a plurality of inverted domains 14 which are formed at predetermined intervals at the interior of an optical crystal substrate 10, and a waveguide 16 formed in a direction orthogonal to the respective inverted domains 14.

Figure 2:
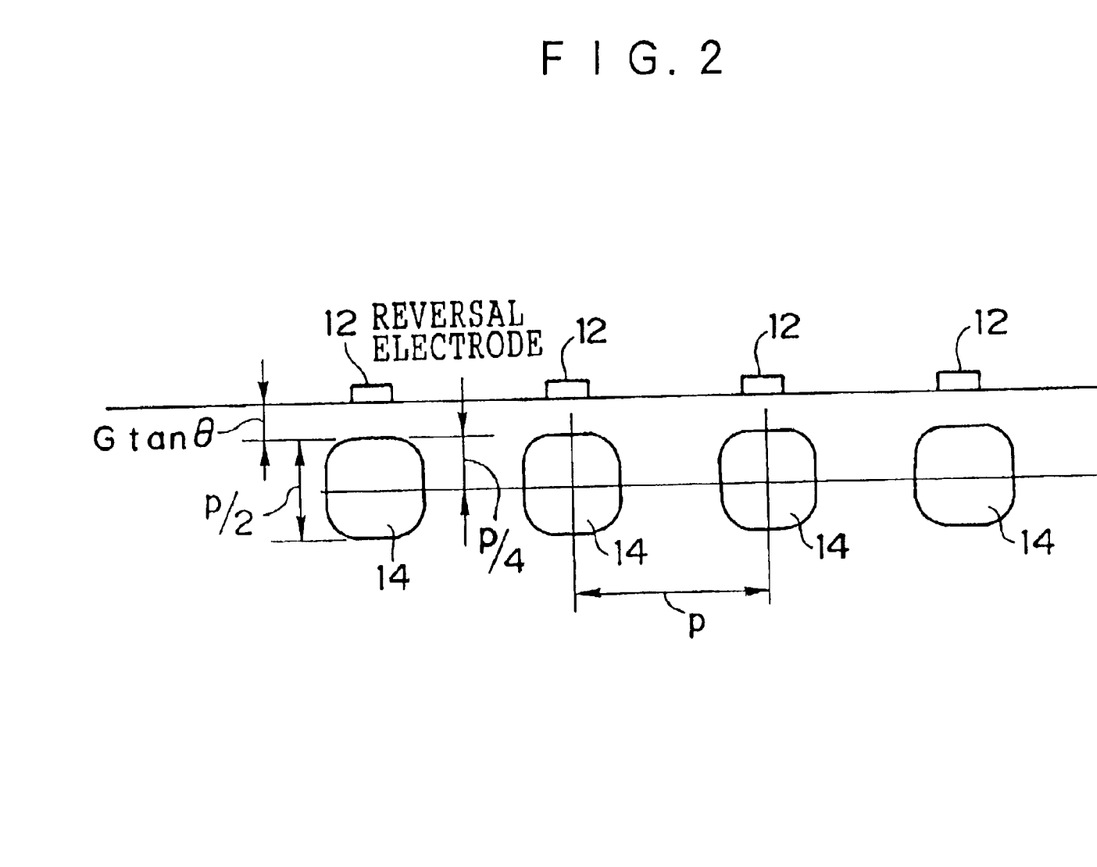
FIG. 2 is a sectional view of main portions of the wavelength converting element.

FIG. 2 is a sectional view of the wavelength converting element 1 shown in FIG. 1, as viewed from the Y axis direction. Comb-shaped reversal electrodes 12 are formed at a main surface 11 of the optical crystal substrate 10. A pitch p between the respective reversal electrodes 12 can be computed from the phase matching wavelength of the second harmonic and the fundamental wave. When the pitch p is determined, the size of the region which optimizes the efficiency of the inverted domains 14 is determined. Usually, the size of the region of the inverted domains 14 is set to be ½ of the pitch p.

Figure 3:
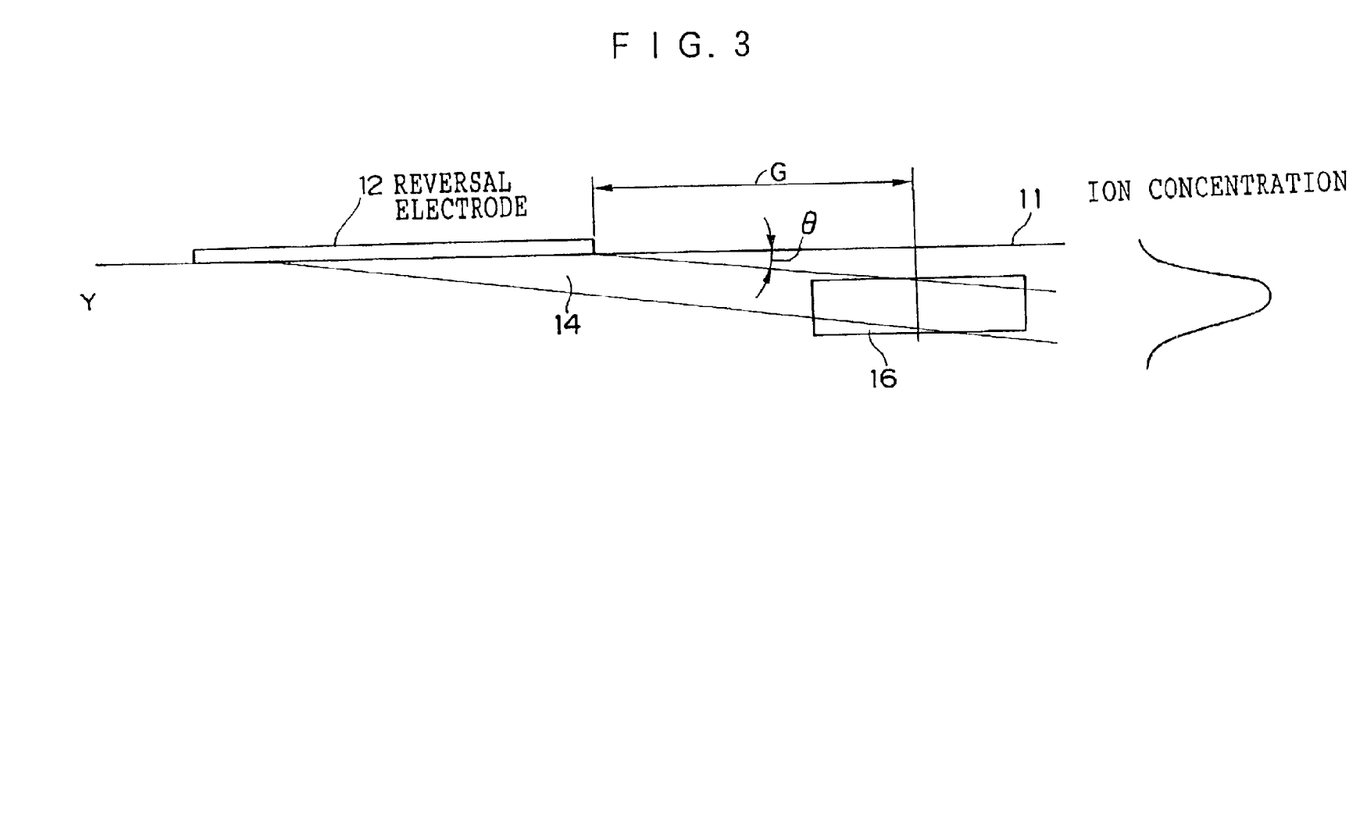
FIG. 3 is a sectional view of main portions of the wavelength converting element.

FIG. 3 is a sectional view of the wavelength converting element 1 shown in FIG. 1, as viewed from the Y surface direction. The inverted domains 14 are formed at the interior of the optical crystal substrate 10 so as to form an angle θ with respect to the main surface 11. When the distance, in the direction parallel to the main surface 11, from the end of the reversal electrode 12 to the central position of the inverted domain 14 is G, the distance from the main surface 11 to the central position of the inverted domain 14 is (G·tanθ+p/4).

The waveguide 16 is formed by ion implantation so as to have a concentration peak at the interior of the optical crystal substrate 10. If formation of the waveguide 16 is carried out under the condition that there is no channeling, the peak concentration of the implanted ions which are implanted by ion implantation is determined by the type of the implanted ions, the type of the substrate, and the implantation energy. Accordingly, if the type of the implanted ions is protons and the substrate is an MgO doped $LiNbO_3$, the peak concentration is determined by the implantation energy. Thus, the ion implantation energy is controlled such that the peak concentration is at the depth at the central portion of the inverted domain, i.e., at the position (G·tanθ+p/4), and the overlapping of the inverted domain and the ion implanted waveguide is optimized. Thereafter, by carrying out heat treatment, the damage to the crystal caused by ion implantation is recovered, and the light propagation loss of the waveguide is reduced.

Next, the method of manufacturing the wavelength converting element 1 will be explained.

Figure 4:
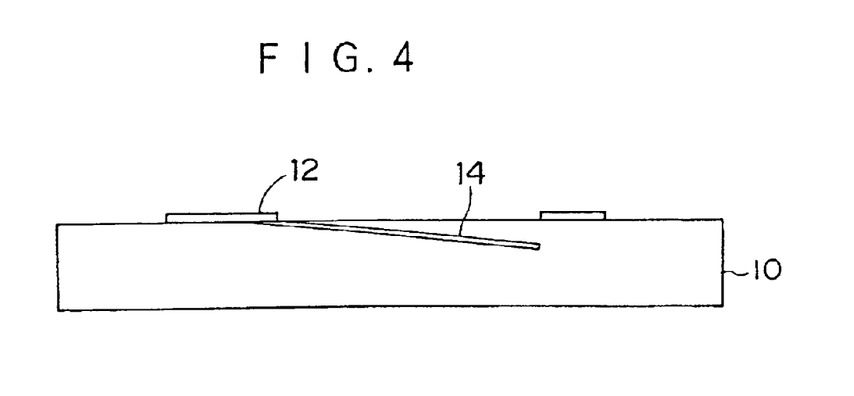
FIG. 4 is a diagram for explaining a method of manufacturing the wavelength converting element.

The comb-shaped reversal electrodes 12 are formed on the optical crystal substrate 10, which is formed by $LiNbO_3$ doped with MgO and whose C axis is inclined by 3° with respect to the substrate surface (main surface). Then, a predetermined high voltage (e.g., 2 kV) is applied between the electrodes, and as shown in FIG. 4, an inverted domain 14 is formed at the interior of the optical crystal substrate 10. At this time, the time over which the voltage is applied and the like are adjusted such that the region of the inverted domain is substantially ½ of the inversion pitch p (e.g., 2.38 μm for a wavelength of 946 nm).

Figure 5:
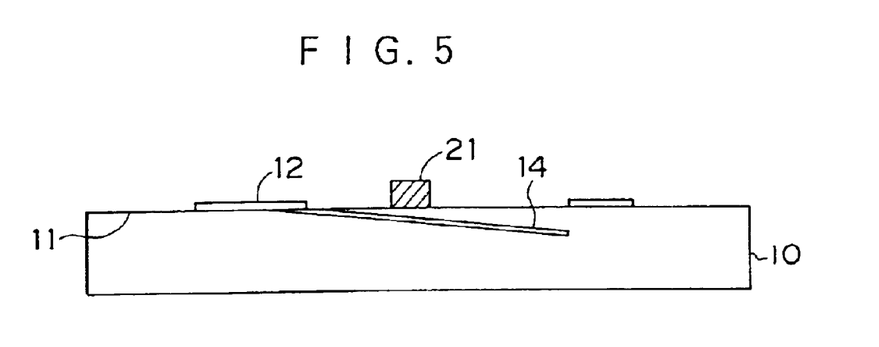
FIG. 5 is a diagram for explaining the method of manufacturing the wavelength converting element.

Then, as shown in FIG. 5, a resist pattern 21 for waveguide (WG) is formed at a waveguide formation position, i.e., at a position at a distance G (here, 8 μm) from the end of the reversal electrode 12 on the main surface 11. The resist pattern 21 determines the transverse width of the waveguide 16 shown in FIG. 3, and here, is 7 μm.

Figure 6:
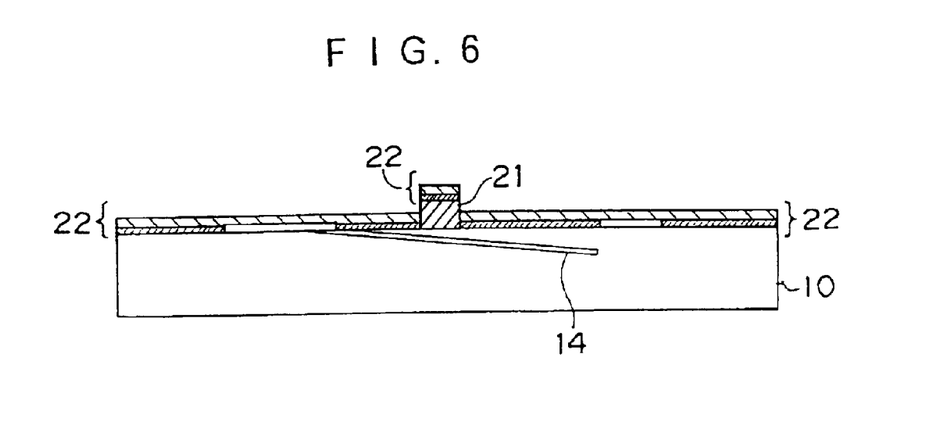
FIG. 6 is a diagram for explaining the method of manufacturing the wavelength converting element.
Figure 7:
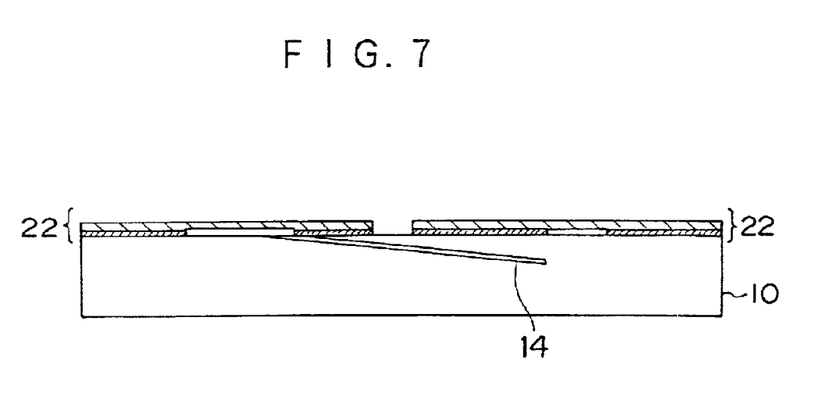
FIG. 7 is a diagram f or explaining the method of manufacturing the wavelength converting element.

Next, as shown in FIG. 6, Cr/Au is deposited on the entire main surface from above the resist pattern 21, such that a Cr/Au pattern (Cr: 10 nm/Au: 100 nm) 22 is formed. Then, as shown in FIG. 7, the resist pattern 21 is melted and removed by a lift-off method.

Figure 8:
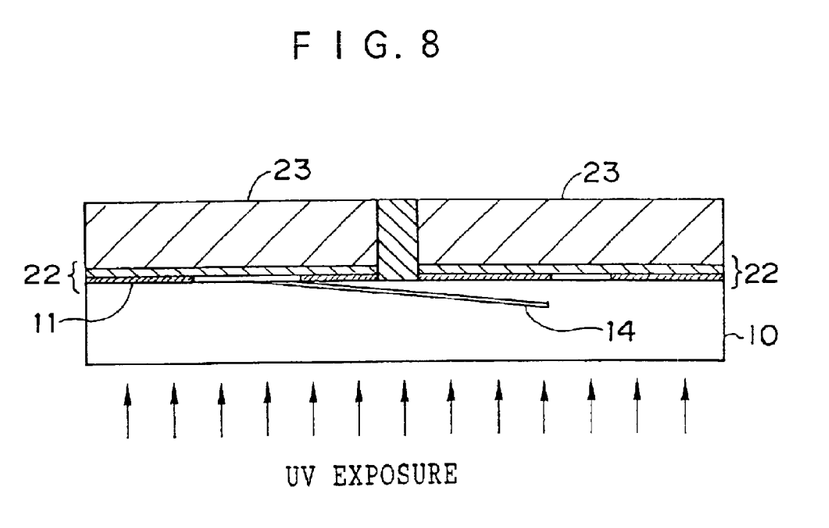
FIG. 8 is a diagram for explaining the method of manufacturing the wavelength converting element.
Figure 9:
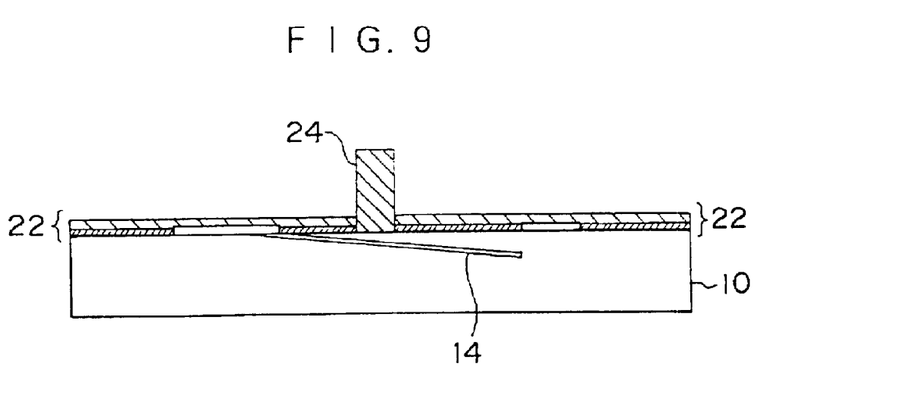
FIG. 9 is a diagram for explaining the method of manufacturing the wavelength converting element.

Further, as shown in FIG. 8, a thick-film negative photoresist 23 is applied to 5 μm on the main surface 11 side. Exposure is carried out by applying ultraviolet rays from the reverse surface of the optical crystal substrate 10. In this way, the negative photoresist 23, which is not exposed due to the Cr/Au pattern 22, is removed. Namely, as shown in FIG. 9, the thick-film negative photoresist 23 is developed, and a resist pattern 24 is formed at the waveguide formation position.

Figure 10:
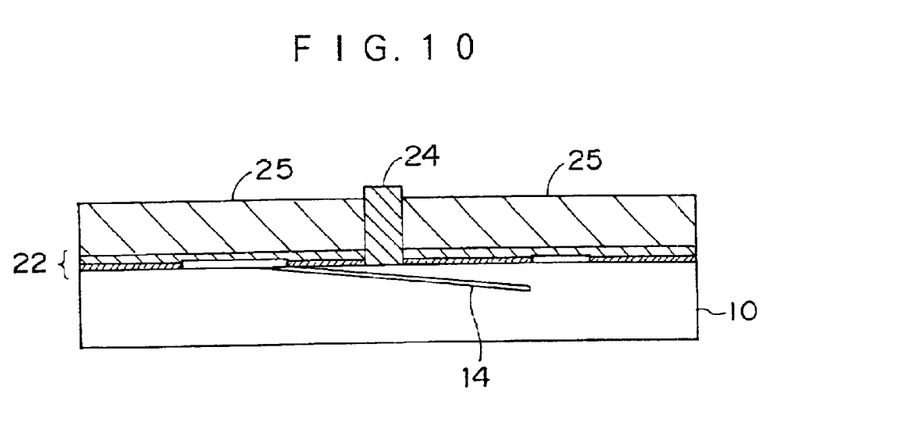
FIG. 10 is a diagram for explaining the method of manufacturing the wavelength converting element.
Figure 11:
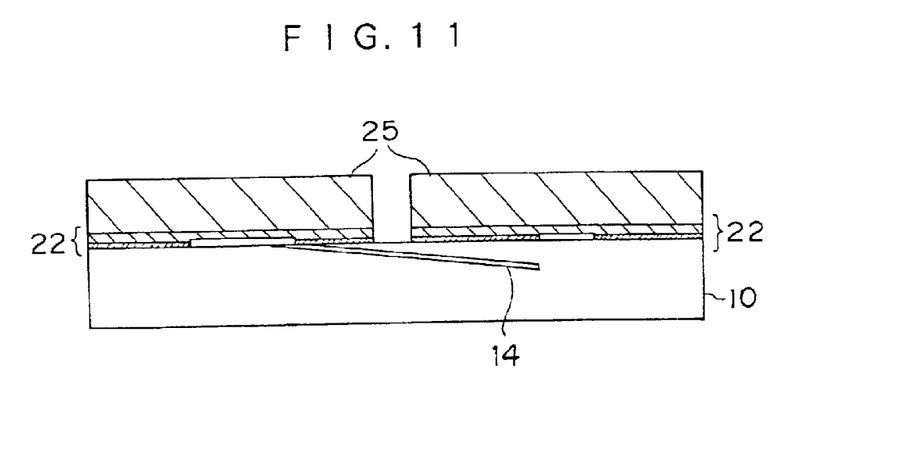
FIG. 11 is a diagram for explaining the method of manufacturing the wavelength converting element.
Figure 12:
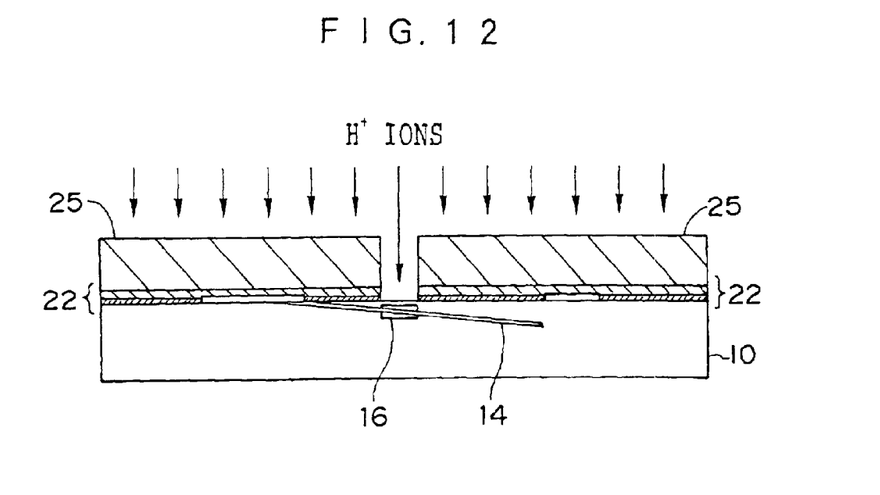
FIG. 12 is a diagram for explaining the method of manufacturing the wavelength converting element.

Next, electroplating is carried out on the Cr/Au pattern 22, and as shown in FIG. 10, an Au film 25, which is a metal film of a thickness (e.g., 3 μm) which can impede proton ($H^+$) implantation, is formed. Then, the optical crystal substrate 10 is immersed into a resist peeling solution, and as shown in FIG. 11, the resist pattern 24 illustrated in FIG. 9 is removed.

Then, protons are implanted, at an angle of 5 to 10° with respect to the X axis, into the optical crystal substrate 10 which is masked by the electroplating. During the implanting, the optical crystal substrate 10 holds heat due to the proton implantation, and in order to prevent scattering of the implanted protons due to this heat and breakage due to heat shock, the optical crystal substrate 10 is cooled.

The implantation energy is selected so that the concentration peak is at a depth (here, 1.8 μm) of about (G·tanθ+p/4) from the substrate surface. The implantation energy may be determined by using a simulator based on LSS theory. Or, the peak position may be measured by SIMS analysis using the implantation energy as a parameter, and the implantation energy may be determined from the results thereof.

Further, the proton implantation amount is prescribed by the refractive index distribution and the wavelength of the waveguided light. At this wavelength (900 nm through 1.1 μm), a range of $5 \times 10^{16}$ to $1 \times 10^{18}/cm^2$ is selected from experimentation. Here, the implantation energy is 300 keV, and the implantation amount is $2 \times 10^{17}/cm^2$.

Figure 13:
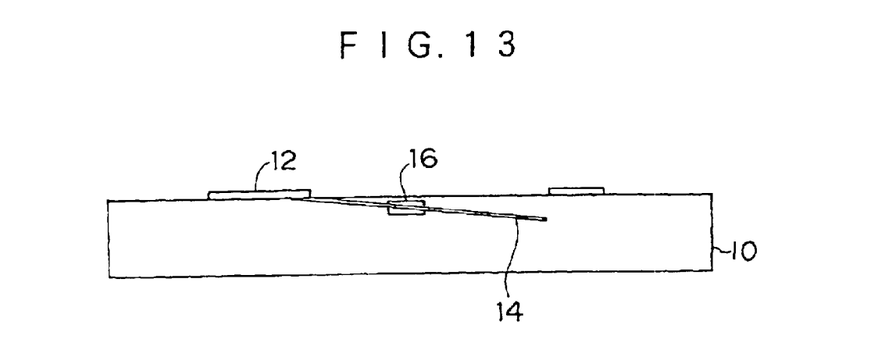
FIG. 13 is a diagram for explaining the method of manufacturing the wavelength converting element.

After ion implantation, as illustrated in FIG. 13, the Au/Cr pattern 22 is removed by etching, and annealing is carried out for one hour at 400° C. such that the crystal damage of the optical crystal substrate 10 is reversed. Thereafter, the element is packaged by processes which are the same as in conventional methods.

In accordance with the manufacturing method described above, as shown in FIGS. 2 and 3, by setting the implanted ion energy to form a waveguide at a position which is (G·tanθ+p/4) from the main surface 11 of the optical crystal substrate 10, the inverted domains 14 and the waveguide 16 can easily be manufactured at the same position. Conversely, by selecting the values of G and θ, the position at which the waveguide 16 is formed from the main surface 11 of the optical crystal substrate 10 can be designed to be at the interior of the substrate. By making the refractive index distribution of the waveguide be a substantially Gaussian distribution, the laser light can be made to be unimodal.

Namely, a waveguide 16 having a peak at a desired depth is formed in the waveguide converting element 1 which is manufactured in this way. Thus, the overlapping of the inverted domains 14 and the waveguide 16 is optimized, the overlapping of the fundamental wave and the inverted domains 14 is improved, and the wavelength converting efficiency is improved. Further, by making the refractive index distribution of the waveguide 16 a Gaussian distribution, the beam shape can be improved as compared with the conventional art, and joining to a lens or a fiber is easy.

In a conventional wavelength converting element, because the waveguide is formed at the surface of the optical crystal substrate, the waveguide is provided in a vicinity of the reversal electrodes in order to ensure overlapping with the inverted domains. In this way, a waveguiding loss occurs at the distal ends of the comb-shaped electrodes due to the damage at the time of applying the high voltage.

In contrast, in the wavelength converting element 1 of the present invention, the waveguide can be provided at a region which is not damaged at the time of application of high voltage. Thus, as compared with the conventional art, the waveguiding loss can be greatly reduced.

Further, in the wavelength converting element 1, the waveguide 16 is provided at the interior of the optical crystal substrate 10. Thus, the effect of chipping the edge portions at the time of end surface polishing in a subsequent step for completing the element, is reduced, and the yield is improved.

Moreover, at the time of directly joining the wavelength converting element 1 to an unillustrated laser diode, the portion which contacts the light emitting portion of the laser diode is the joining surface. Thus, the damage to the laser diode at the time of assembly, and at the time of alignment in particular, is reduced, and the yield is improved.

In the above embodiment, an example is described of optimizing the inverted domains 14 and the waveguide 16. However, the present invention is not limited to the same. Further, in the above-described embodiment, the waveguide 16 is fabricated after the inverted domains 14 are formed. However, conversely, the inverted domains 14 may be formed after the waveguide 16 is formed. At this time, the pitch of the inverted domains and the optimal size of the region may be computed in advance, and ion implantation may be carried out to suit these inverted domains.

Moreover, in the above-described embodiment, an inclined optical crystal substrate 10 is used. However, a waveguide may be fabricated in the same way at bulk inverted domains such as at a Z plate. As a result, the beam shape can be improved even at conventional bulk inverted domain waveguide wavelength converting elements.

What is claimed is:

1. A wavelength converting element comprising:
an optical crystal substrate;
inverted domains formed at an interior of the optical crystal substrate; and
a waveguide which is formed by ion implantation and which intersects the inverted domains, wherein the waveguide is formed by proton implantation and the waveguide is formed in the interior of the optical crystal substrate and substantially not exposed to an exterior of the optical crystal substrate.

2. A wavelength converting element comprising:
an optical crystal substrate:
inverted domains formed at an interior of the optical crystal substrate; and
a waveguide which is formed by ion implantation and which intersects the inverted domains, wherein the waveguide is formed by proton implantation and an angle formed by a surface of the optical crystal substrate and a C axis of the optical crystal substrate is $\theta$, a period at which the inverted domains are formed is p, and a distance from a distal end of a comb-shaped electrode at the surface of the optical crystal substrate for forming the inverted domains to a central position of the waveguide formed by the ion implantation is G, and the central position of the waveguide is at a depth substantially equal to $(G \cdot \tan\theta + p/4)$ from the surface of the optical crystal substrate.

3. A wavelength converting element according to claim 2, wherein the central position of the waveguide is the concentration peak of the ion implantation.

4. A wavelength converting element comprising:
an optical crystal substrate;
inverted domains formed at an interior of the optical crystal substrate; and
a waveguide which is formed by ion implantation and which intersects the inverted domains, wherein an angle formed by a surface of the optical crystal substrate and a C axis of the optical crystal substrate is $\theta$, a period at which the inverted domains are formed is p, and a distance from a distal end of a comb-shaped electrode at the surface of the optical crystal substrate for forming the inverted domains to a central position of the waveguide formed by the ion implantation is G, and the central position of the waveguide is at a depth substantially equal to $(G \cdot \tan\theta + p/4)$ from the surface of the optical crystal substrate.

5. A wavelength converting element according to claim 4, wherein the central position of the waveguide is the concentration peak of the ion implantation not at the surface of the optical substrate.

6. A wavelength converting element comprising:
an optical crystal substrate;
inverted domains formed at an interior of the optical crystal substrate; and
a waveguide which is formed by ion implantation and which intersects the inverted domains, wherein the waveguide is formed by proton implantation and a central position of the waveguide is substantially at a center depth of an intersecting portion of one of the inverted domains intersecting the waveguide, wherein the center depth is from a top surface of the optical crystal substrate to a center of the intersecting portion.

7. A wavelength converting element comprising:
an optical crystal substrate;
inverted domains formed at an interior of the optical crystal substrate; and
a waveguide which is formed by ion implantation and which intersects the inverted domains, wherein the waveguide is formed by proton implantation and an angle formed by a surface of the optical crystal substrate and a C axis of the optical crystal substrate is $\theta$, a period at which the inverted domains are formed is p, and a distance from a distal end of a comb-shaped electrode at the surface of the optical crystal substrate for forming the inverted domains to a central position of the waveguide formed by ion implantation is G, and the central position of the waveguide is at a depth greater than $G \cdot \tan\theta$ from the surface of the optical crystal substrate.

8. A method of manufacturing a wavelength converting element comprising the steps of:
forming inverted domains at an interior of an optical crystal substrate;
pattern-forming a metal film on the optical crystal substrate at which the inverted domains have been formed, such that at least a region at which a waveguide is to be formed is exposed;
applying a negative photoresist on the patterned metal film;
exposing the negative photoresist by using the patterned metal film as a mask, by irradiating ultraviolet light from a reverse surface of the optical crystal substrate to which the negative photoresist has been applied;
carrying out developing thereafter so as to form a resist pattern on the region at which the waveguide is to be formed;
forming a metal film by electroplating by using the patterned metal film as an electrode and by using the negative photoresist as a mask;

removing the negative photoresist thereafter;

carrying out ion implantation at portions of the optical crystal substrate from which the negative photoresist has been removed, by using the metal film formed by the electroplating as an ion implantation mask; and forming an optical waveguide by carrying out annealing thereafter.

9. A method of manufacturing a wavelength converting element according to claim 8, wherein given that an angle formed by a surface of the optical crystal substrate and a C axis of the optical crystal substrate is $\theta$, a period at which the inverted domains are formed is p, and a distance from a distal end of a comb-shaped electrode, which is for forming the inverted domain and which is formed at the surface of the optical crystal substrate, to a central position of the waveguide formed by the ion implantation is G, in the ion implantation, the concentration peak of the ion implantation is formed at a distance of substantially $(G \cdot \tan\theta + p/4)$ from the surface of the optical crystal substrate.

10. A method of manufacturing a wavelength converting element according to claim 8, wherein the metal film formed by the electroplating is a gold film.

11. A method of manufacturing a wavelength converting element according to claim 9, wherein the metal film formed by the electroplating is a gold film.

12. A method of manufacturing a wavelength converting element according to claim 8, wherein in the ion implantation, protons are implanted.

13. A method of manufacturing a wavelength converting element according to claim 9, wherein in the ion implantation, protons are implanted.

14. A method of manufacturing a wavelength converting element according to claim 10, wherein in the ion implantation, protons are implanted.

15. A method of manufacturing a wavelength converting element according to claim 11, wherein in the ion implantation, protons are implanted.

16. A method of manufacturing a wavelength converting element comprising:

forming inverted domains at an interior of an optical crystal substrate using comb-shaped electrodes formed at a surface of the optical crystal substrate; and forming an optical waveguide in the interior of the optical crystal substrate, wherein an angle formed by the surface of the optical crystal substrate and a C axis of the optical crystal substrate is $\theta$, a period at which the inverted domains are formed is p, and a distance from a distal end of one of the comb-shaped electrodes to a central position of the waveguide formed by ion implantation is G, and in the ion implantation, the concentration peak of the ion implantation is formed at a distance of substantially $(G \cdot \tan\theta + p/4)$ from the surface of the optical crystal substrate.

17. A method of manufacturing a wavelength converting element comprising a step of forming a waveguide by carrying out ion implantation after inverted domains have been formed at an interior of an optical crystal substrate, wherein in the ion implantation, protons are implanted and the step of forming the waveguide comprises forming a central position of the waveguide substantially at a center depth of an intersecting portion of one of the inverted domains intersecting the waveguide, wherein the center depth is from a top surface of the optical crystal substrate to a center of the intersecting portion.

18. A method of manufacturing a wavelength converting element comprising a step of forming inverted domains after a waveguide has been formed at an interior of an optical crystal substrate by carrying out ion implantation, wherein a central position of the waveguide is substantially at a center depth of an intersecting portion of one of the inverted domains intersecting the waveguide, wherein the center depth is from a top surface of the optical crystal substrate to a center of the intersecting portion.

19. A method of manufacturing a wavelength converting element comprising a step of forming a waveguide by carrying out ion implantation after inverted domains have been formed at an interior of an optical crystal substrate, wherein in the ion implantation, protons are implanted and the step of forming the waveguide comprises forming a central position of the waveguide at a depth greater than $G \cdot \tan\theta$ from the surface of the optical crystal substrate, wherein an angle formed by a surface of the optical crystal substrate and a C axis of the optical crystal substrate is $\theta$, a period at which the inverted domains are formed is p, and a distance from a distal end of a comb-shaped electrode at the surface of the optical crystal substrate for forming the inverted domains to a central position of the waveguide formed by ion implantation is G.

20. A method of manufacturing a wavelength converting element comprising a step of forming inverted domains after a waveguide has been formed at an interior of an optical crystal substrate by carrying out ion implantation, wherein an angle formed by a surface of the optical crystal substrate and a C axis of the optical crystal substrate is $\theta$, a period at which the inverted domains are formed is p, and a distance from a distal end of a comb-shaped electrode at the surface of the optical crystal substrate for forming the inverted domains to a central position of the waveguide formed by ion implantation is G, and the central position of the waveguide is at a depth greater than $G \cdot \tan\theta$ from the surface of the optical crystal substrate.

* * * * *